United States Patent Office 3,450,449
Patented June 17, 1969

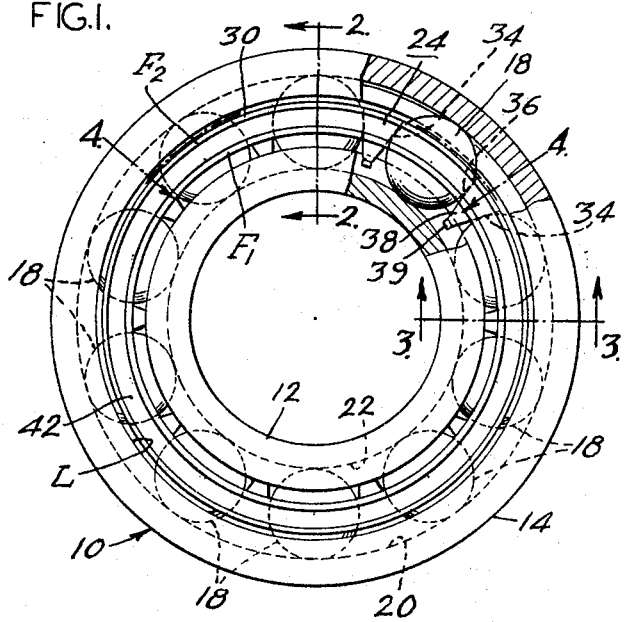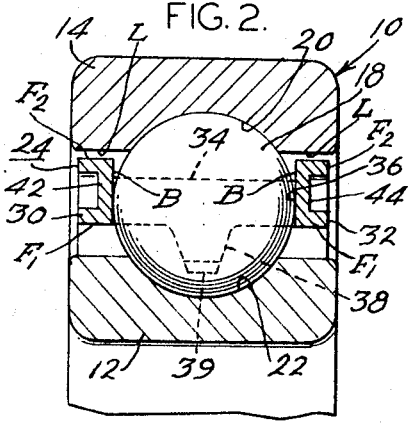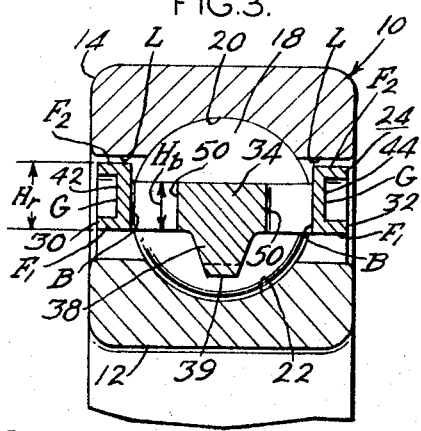
June 17, 1969    L. B. SIBLEY ET AL    3,450,449
ROLLING BEARING ASSEMBLY
Filed July 13, 1967
INVENTORS:
LEWIS B. SIBLEY
WILLIAM L. RHOADS
BY Howson & Howson
ATTYS.

3,450,449
ROLLING BEARING ASSEMBLY
Lewis B. Sibley, Wayne, and William L. Rhoads, Charlestown Township, Chester County, Pa., assignors to SKF Industries, Inc., King of Prussia, Pa., a corporation of Delaware
Filed July 13, 1967, Ser. No. 653,109
Int. Cl. F16c 33/38, 1/24, 19/20
U.S. Cl. 308—187  2 Claims

ABSTRACT OF THE DISCLOSURE

A cage for guiding the rolling elements of a rolling bearing assembly such as a ball bearing comprising a pair of annular rail members of U-shaped cross section, and a plurality of circumferentially spaced bars formed integrally with the rail members having arcuate side faces to define circular pockets for the balls. The bars are of a radial height less than the radial height of the rails and are provided with a plurality of radial openings.

---

This invention relates to improvements in rolling bearing assemblies and more particularly to improvements in rolling bearing assemblies incorporating a cage for guiding the rolling elements.

Even though the present invention is illustrated in connection with a ball bearing, it is to be understood that the concept and advantages of the present invention apply to other types of rolling bearing assemblies employing a cage to guide the rolling elements. In ball bearings, the cage generally comprises a pair of annular rings or rails which are interconnected by a plurality of cross pieces or bars which are circumferentially spaced apart and have arcuate side edge portions. Adjacent confronting arcuate side edge portions of the web members define pockets of a configuration closely conforming to the shape of the balls.

These prior bearing assemblies have several disadvantages and drawbacks, particularly when used at ultra high speeds. For example, it has been found that in ultra high speed rolling bearings, the bearings fail due to lubrication distress and wear due to inadequate cooling by the lubricant fluid. Further, it has been found that the critical contacting surfaces of the cages tend to warp due to centrifugal forces at high speeds. In tests conducted on bearings having cages of the above type the guide surfaces of the cage were observed to warp into a scalloped shape by reason of the twisting of the rails due to the centrifugal forces on the cage bars. More specifically it was observed that the contact of the cage with the guide ring lands is concentrated on small areas of the edge whereby it is virtually impossible to effectively lubricate these contact zones as compared with assemblies where the contact was distributed more uniformly over the entire rail surfaces.

With the foregoing in mind, an object of the present invention is to provide an improved cage construction for a rolling bearing assembly which provides a greater resistance to centrifugal warping particularly in ultra high speed applications. More specifically a cage in accordance with the present invention comprises a pair of annular rings or rails, a plurality of cross pieces or bars extending between the rings and circumferentially spaced apart to define pockets for the rolling elements.

In a ball bearing assembly of the type illustrated, the bars have arcuate side faces so that the pocket opening is generally circular and closely conforms to the contour of the balls. In the present instance, however, the rails are of channel or U-shaped cross section defining a circumferentially extending groove facing in an outward axial direction relative to the balls. This construction provides an increased stiffness of the rails to minimize warping of the critical cage rail guiding surfaces. Furthermore, the outer diameter and the inner diameter of the cage bars are relieved and are provided with a plurality of radial openings thereby reducing the mass of the bars and distributing the centrifugal reaction of the bars more evenly over the circumference of the cage rails. The channel rail section and the cage bar modifications increase the exposed cage area substantially. Additionally the added radial openings in the bars act as small centrifugal pumps to circulate lubricant and gases through the bearing more effectively than is normally achieved with conventional cage pocket arrangements which are almost completely filled with balls during operation of the bearing assembly which tends to impede centrifugal circulation.

With the foregoing in mind, an object of the present invention is to provide a novel cage construction for rolling bearings providing more reliability and more efficient use of lubricant at high speeds.

Another object of the present invention is to provide a novel cage construction wherein the cage rails are of a channel configuration or of U-shaped cross section to increase their torsional cross sectional stiffness providing a greater resistance to centrifugal warping of the cage rails.

A further object of the present invention is to provide a novel cage wherein the cross bars are of smaller radial height than the rails and are provided with radial openings to reduce mass and distribute the centrifugal reaction of the bars more evenly over the cage rails.

These and other objects of the present invention and the various features and details of a bearing constructed in accordance with the present invention are hereinafter more fully set forth with reference to the accompanying drawing, wherein:

FIG. 1 is a side elevational view partly in section of a ball bearing assembly in accordance with the present invention;

FIGS. 2, 3 and 4 are enlarged sectional views taken on lines 2—2, 3—3 and 4—4 of FIG. 1; and FIG. 5 is an enlarged fragmentary perspective view of a portion of the cage.

Referring now to the drawing, and particularly to FIG. 1 thereof, there is shown a rolling bearing assembly 10 in accordance with the present invention.

The rolling bearing assembly illustrated is a ball bearing. However, it is to be understood that the principle of the present invention has useful application in other types of bearing assemblies.

The ball bearing assembly illustrated comprises inner and outer rings 12 and 14 respectively which are spaced apart to define an annular space 16 therebetween for a plurality of balls 18. In the present instance, the inner and outer rings have confronting circumferentially extending raceways 20 and 22 respectively which, as illustrated, are of curvilinear or arcuate cross section. The assembly further includes a cage, broadly designated by the numeral 24 for spacing the balls circumferentially.

In accordance with the present invention, the ball bearing assembly is characterized by novel features of construction and arrangement which at ultra high speed applications effectively resists the centrifugal warping of the critical cage rail guiding surfaces and which incorporates a novel means for circulating lubricant thereby extending the life of the entire assembly considerably. To this end, the case 24 which is of one-piece construction, comprises a pair of axially spaced apart annular rings or rail members 30 and 32 and a plurality of circumferentially spaced axially extending bars or webs 34 connecting the rail members in spaced apart relation.

The side faces of each bar 34 are arcuate so that adjacent side faces define a generally circular opening or pocket 36 for the balls. A tab 38 projects radially downwardly from the center of each bar having an outer terminal detent portion 39, the gap between adjacent detents being less than the diameter of the ball thereby to limit radial inward movement of the balls relative to the cage. In the present instance each of the rail members 30 and 32 is of generally U-shaped cross section comprising a radially directed base B and a pair of axially outwardly projecting annular flanges $F_1$ and $F_2$ which are radially spaced to define a circumferentially extending groove G which opens axially outwardly relative to the balls. In the present instance, the outer flange $F_2$ of each rail member confronts and lies closely adjacent land portions L on opposite sides of the outer raceway so that the cage rides and is guided on the outer ring. This construction increases the stiffness of the rails to minimize the centrifugal warping of the critical cage rail guiding surfaces which in the present instance is the outer surface of the rails confronting the outer ring. Further, the radial height $H_b$ of the cage bars is less than the radial height $H_r$ of the base B of the channel rail members and the rail members are provided with a plurality of radial openings 50, the combination reducing the mass of the bars and serving to distribute the centrifugal reaction of the bars more evenly over the circumference of the cage rails.

The openings 50 also serve as small centrifugal pumps to circulate lubricant and gases through the bearing more effectively than is normally achieved by the cage pockets of conventional assembiles which are almost completely filled with balls during operation of the bearing. The channel rail sections together with the cage bar modification increase the cage area substantially. In summary, the cage modifications are particularly effective in providing a better operating bearing assembly at ultra high speeds and one which utilizes the available lubricants more efficiently and wherein the damage to the cage resulting from centrifugal warping is minimized thereby extending the life of the assembly considerably.

While a particular embodiment of the present invention has been illustrated and described herein, it is not intended to limit the invention and changes and modifications may be made within the scope of the following claims.

We claim:
1. In a rolling bearing assembly including a pair of spaced apart rings, a plurality of rolling elements in the annular space between the rings and a one piece cage for guiding the rolling elements, said cage comprising a pair of spaced annular rail members, a plurality of bars connecting the rails in spaced relation circumferentially spaced to define a plurality of pockets for the rolling elements, each of said rail members being of generally U-shaped cross section comprising a base and inner and outer flanges extending from opposite ends of the base defining a circumferential groove facing outwardly relative to the rolling elements, said outer flange confronting the outer ring in close proximity thereto, means defining a pair of axially spaced radial openings in each of said bars, the radial height of the base of each flange of the bar end members is greater than the radial height of the rails, the lower edge of the bars is aligned with the lower edge of the inner flange of the rail members whereby the distorting effect on the outer flange due to centrifugal force of the bar is minimized and a tab having an outer terminal detent portion projecting radially downwardly from the center of each bar member, the gap adjacent the detents being less than the cross section of the rolling elements thereby to limit radial inward movement of the rolling elements relative to the cage.

2. A rolling bearing assembly as claimed in claim 1 wherein the rolling elements are balls.

References Cited

UNITED STATES PATENTS

| | | | |
|---|---|---|---|
| 644,245 | 2/1900 | Gates | 308—201 |
| 1,712,222 | 5/1929 | Linde | 308—201 |
| 1,913,275 | 6/1933 | Herrmann | 308—217 |
| 2,975,008 | 3/1961 | Ruley | 308—201 |
| 2,987,350 | 6/1961 | Hoy | 308—201 |
| 3,195,965 | 7/1965 | Van Dorn | 308—187 |

FOREIGN PATENTS 348,561   9/1919   Germany.

MARTIN P. SCHWADRON, *Primary Examiner.*

FRANK SUSKO, *Assistant Examiner.*

U.S. Cl. X.R.

308—195, 201

UNITED STATES PATENT OFFICE
CERTIFICATE OF CORRECTION

Patent No. 3,450,449　　　　　　　Dated　June 17, 1969

Inventor(s) Lewis B. Sibley and William L. Rhoads

It is certified that error appears in the above-identified patent and that said Letters Patent are hereby corrected as shown below:

Column 4, line 15, "bar" should read -- rail --.
Column 4, line 16; "rails" should read --bars--

SIGNED AND
SEALED
OCT 13 1970

(SEAL)
Attest:

Edward M. Fletcher, Jr.
Attesting Officer

WILLIAM E. SCHUYLER, JR.
Commissioner of Patents